United States Patent [19]

Pepper et al.

[11] 4,291,950
[45] Sep. 29, 1981

[54] ELECTRO-OPTIC DEVICES USING STARK-INDUCED BIREFRINGENCE AND DICHROISM

[75] Inventors: David M. Pepper, Los Angeles; Marvin B. Klein, Malibu, both of Calif.

[73] Assignee: Hughes Aircraft Company, Culver City, Calif.

[21] Appl. No.: 138,463

[22] Filed: Apr. 8, 1980

[51] Int. Cl.$^3$ .............................................. G02F 1/17
[52] U.S. Cl. ..................................... 350/389; 350/390
[58] Field of Search .............................. 350/389–391, 350/392–393, 355–356, 397–398, 400, 406; 331/94.5 M, 94.5 Q; 332/7.51

[56] References Cited

U.S. PATENT DOCUMENTS

| | | | |
|---|---|---|---|
| 3,497,828 | 2/1970 | Telk et al. | 350/389 |
| 3,842,372 | 10/1974 | Pao et al. | 331/94.5 M |
| 4,033,670 | 7/1977 | Tanton et al. | 350/375 |
| 4,085,387 | 4/1978 | Asawa et al. | 331/94.5 M |
| 4,197,008 | 4/1980 | Pinnow et al. | 350/388 |

OTHER PUBLICATIONS

Schawlow, A. L., "Lasers & Light", Readings From Scientific American, W. H. Freeman & Co. 6-1968, pp. 332-338.

Landman, A., "Modulation of the 3.39-$\mu$ NE Line by Electro-Optic Gases," Jr. App. Physics, 8-1967, pp. 3668-3675.

Asawa et al., "Wideband Modulation of the $C^{13}O_2^{16}$ Laser R(18) Line at 10.784 $\mu$m with an $N^{14}H_3$ Stark Cell", App. Phys. Lett. 1-15-77, pp. 96-98.

Martin et al., "Identification of Absorption Lines in Gases Used to Modulate $CO_2$ Laser", IEEE Jr. Q.E., QE10, 2-1974, pp. 191-195.

Landman et al., "Light Modulation by Means of the Stark Effect in Molecular Gases–Application to $CO_2$ Lasers", App. Physics Letters 12-1-69, pp. 357-360.

Primary Examiner—William H. Punter
Attorney, Agent, or Firm—Paul M. Coble; Kenneth W. Float; William H. MacAllister

[57] ABSTRACT

Optical devices are disclosed which rely upon Stark-induced resonant, tunable, and saturable birefringence and dichroism to provide both digital and linear amplitude optical modulators, optical shutters, tunable optical filters, and optical cutoff limiters. A Stark cell is disposed along a light beam path between two crossed polarizers with its electric field direction at 45° to the polarizer pass directions. The Stark cell contains a medium exhibiting a dichroic absorption resonance at a predetermined frequency as well as birefringence at frequencies slightly above and slightly below the frequency of the absorption resonance. By applying an appropriate control voltage between the Stark cell electrodes, an electric field is generated within the Stark cell to tune the absorption resonance to overlap the frequency of an input laser beam and thereby vary the transmission through the device from maximum near resonance to zero at frequencies far away from resonance.

7 Claims, 6 Drawing Figures

ELECTRO-OPTIC DEVICES USING STARK-INDUCED BIREFRINGENCE AND DICHROISM

TECHNICAL FIELD

This invention relates to optical devices employing a Stark-induced resonant, tunable, and saturable birefringent and dichroic element.

BACKGROUND OF THE INVENTION

1. Field of the Invention

The invention provides a variety of optical devices including digital and linear amplitude optical modulators, optical shutters, tunable optical filters, and optical cutoff limiters.

2. Description of the Prior Art

In a classic form of electro-optic modulator an electro-optic medium is disposed between a pair of crossed polarizers along a light beam path and is oriented so that an electric field is applied to the medium at an angle of 45° with respect to the polarizer pass directions. Linearly polarized light emerging from the first polarizer divides into equal components along the two principal directions of the electro-optic medium. The electro-optic effect produced by the applied electric field causes these two components to travel through the medium at different velocities and hence gradually become out of phase. An elliptically polarized light beam emerges from the medium, and the second polarizer passes only the light component parallel to its transmission direction. By varying the voltage applied to the electro-optic medium, the polarization of the beam can be made more or less elliptic, and as a result the amplitude of the output beam can be modulated accordingly. Further details concerning this type of modulator may be found in a paper by Donald F. Nelson, "The Modulation of Laser Light," *Readings from Scientific American*, W. H. Freeman and Company, June 1968, pages 332-338.

More recently, laser beam modulators have been developed utilizing the Stark effect (the change in the spectrum of a molecule when subjected to an electric field). In such a modulator, a laser beam is passed through a cell containing gas molecules having an absorption resonance near the frequency of the laser beam, and a dc electric field is applied to the cell to shift, or tune, the absorption resonance so as to overlap the frequency of the laser beam. A modulating signal applied to the cell varies the absorption resonance about its steady state value, producing modulation of the laser beam. A particular Stark-tuned modulator for modulating an isotopic carbon dioxide laser beam and utilizing ammonia gas as the Stark medium is disclosed in U.S. Pat. No. 4,085,387, issued Apr. 18, 1978 to Charles K. Asawa et al and assigned to the assignee of the present invention.

In the past electronically tunable optical filters have been provided wherein a spatially periodic dc electric field applied to a birefringent medium disposed between appropriately oriented polarizers is utilized to electronically program the filter with a wide variety of transmission characteristics. For further details concerning this type of electronically tunable filter, reference may be made to patent application Ser. No. 864,356, filed Dec. 27, 1977, by Douglas A. Pinnow et al., now U.S. Pat. No. 4,197,008, and assigned to the assignee of the present invention.

An optical isolator utilizing the Zeeman effect has been devised to protect a laser system from undue absorption of scattered light energy. Such an isolator employs a Faraday rotator disposed along a laser beam path between a pair of polarizers having their respective pass directions for polarized light oriented at 45° with respect to one another. Application of an external magnetic field to the Faraday rotator causes an absorption line in the rotator material to undergo Zeeman splitting into two components which are shifted in opposite directions away from a central frequency. The strength of the magnetic field is adjusted, depending on the type of rotator material, so that light at the central frequency between the split absorption components passes through the rotator. Further details concerning this optical isolator may be found in U.S. Pat. No. 4,033,670, issued July 5, 1977 to George A. Tanton et al.

SUMMARY OF THE INVENTION

It is an object of the present invention to provide an optical modulator capable of operating over a wider dynamic range than prior art optical modulators using the Stark effect and which is less susceptible to optical damage than conventional electro-optic modulators.

It is a further object of the invention to provide a simple and reliable electrically controlled optical shutter in which essentially no light is transmitted in the "off" condition.

It is still another object of the invention to provide a simple and inexpensive electrically tunable, narrow bandpass optical filter of high temperature stability, optical damage resistance, and reliability.

It is a still further object of the invention to provide an optical cutoff limiter having an extremely rapid response time.

The present invention provides an optical device which may be used for any of the aforementioned as well as other applications. The device includes first and second polarizers spaced from one another along a light path and having their respective pass directions for for linearly polarized light oriented perpendicular to one another. A Stark cell disposed along the light path between the polarizers has a pair of electrodes disposed in respective planes parallel to the light path and perpendicular to a predetermined direction other than parallel or perpendicular to the pass direction of the first polarizer. A beam of light including a predetermined frequency is directed through the first polarizer and the Stark cell along the aforementioned path. The Stark cell contains a gaseous medium which exhibits a dichroic absorption resonance in the vicinity of the predetermined frequency for light polarizations parallel and perpendicular to the predetermined direction and further exhibits birefringence at frequencies slightly above and slightly below the frequency of the absorption resonance for the aforementioned parallel and perpendicular light polarizations. A control voltage is applied between the Stark cell electrodes to controllably vary the frequency of the absorption resonance and hence the light transmission through the device.

Additional objects, advantages, and characteristic features of the invention will become readily apparent from the following detailed description of preferred embodiments of the invention when considered in conjunction with the accompanying drawings.

DETAILED DESCRIPTION OF THE INVENTION

Figure 1:
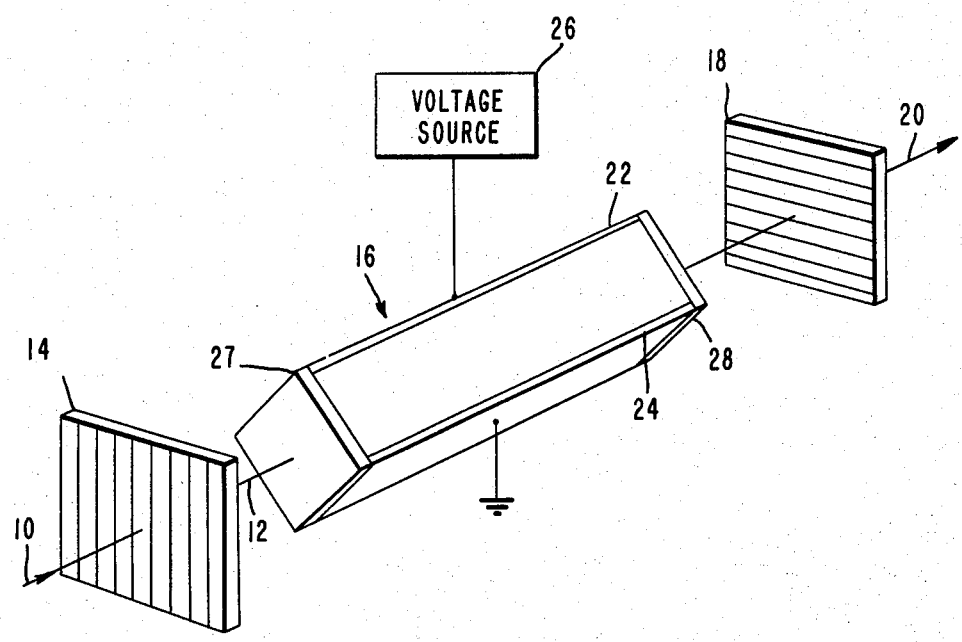
FIG. 1 is a perspective view illustrating an optical device according to the invention.

Referring to FIG. 1 with greater particularity, an optical device according to the invention is shown in which an input beam of light 10 propagating along path 12 first passes through an input polarizer 14 which establishes a desired linear polarization for light in the beam 10. The light emerging from the polarizer 14 then propagates through a Stark cell 16 disposed along the path 12, after which it is applied to an output polarizer, or analyzer, 18 disposed along the path 12. The output polarizer 18 is oriented with its pass direction for linearly polarized light perpendicular to that of the input polarizer 14 and transmits light polarized along its pass direction to provide an output light beam 20.

The input light beam 10 preferably is a laser beam, although for some applications broadband incoherent light may be used. Also, for modulator applications the light beam 10 will be of a predetermined frequency, while for filter applications the light beam 10 will usually include a plurality of frequencies or a range or ranges of frequencies. As a specific example for illustrative purposes, the light beam 10 may be a laser beam generated by an isotopic carbon dioxide ($C^{13}O_2^{16}$) laser tuned to the R(18) transition (at a wavelength of 10.784 $\mu$m) of the (00°1–10°0) vibrational band.

The Stark cell 16 comprises an elongated chamber disposed along the light path 12 and provided with a pair of spaced planar electrodes 22 and 24 disposed on opposite sides of the path 12 in respective planes parallel to the path 12 and perpendicular to a predetermined direction along which an electric field is generated. Preferably, the Stark electrodes 22 and 24 are oriented so that the generated electric field lies along a direction at an angle of 45° with respect to the pass direction of the input polarizer 14, since this orientation facilitates maximum exploitation of the dichroic and birefringent effect discussed below. However, some exploitation of this effect may be achieved as long as the electric field is along a direction other than parallel or perpendicular to the pass direction of the polarizer 14. The electric field may be generated by applying a voltage from a suitable voltage source 26 between the electrodes 22 and 24. The Stark cell 16 also may be provided with a pair of end windows 27 and 28, which may be of ZnSe, for example.

As will be explained in more detail below, the Stark cell 16 contains a gaseous medium which exhibits a dichroic absorption resonance at a frequency $f_o$ in the vicinity of a predetermined frequency $f_l$ in the light beam 10 for light polarizations parallel and perpendicular to the electric field direction and further exhibits birefringence at frequencies slightly above and slightly below the frequency $f_o$ of the absorption resonance for the aforementioned parallel and perpendicular light polarizations. As a specific example for illustrative purposes, when the light beam 10 is at the aforementioned wavelength of 10.784 $\mu$m, the Stark cell 16 may contain ammonia gas ($N^{14}H_3$), since ammonia has an absorption resonance which can be readily tuned to overlap 10.784 $\mu$m. It should be understood, however, that a number of other Stark media may be employed depending upon the frequency of the light beam 10, as long as the selected absorption resonance is not so far away from the frequency of the light beam 10 to preclude tuning the absorption resonance into overlapping relationship with the light frequency using practical electric field values. In a specific exemplary arrangement which may be constructed using ammonia as the Stark medium, the ammonia gas pressure may range from about 0.1 Torr to about 2.0 Torr, preferably being about 0.44 Torr, and the electrodes 22 and 24 may be of stainless steel and may be 10 cm long and 1 cm wide with a separation of 1.54 mm.

Stark tunable transitions within the asQ(6,6) manifold of the ammonia molecule may be utilized as the resonant transitions. In the presence of an electric field, molecular energy levels of the $\nu_2 = 0^a$, J=6, K=6 state become split into a number of Stark levels designated by various values of the quantum number M which represents the molecular angular momentum component along the electric field direction. For particular values of the applied electric field, the respective Stark levels $|M|=6, 5, 4, 3, 2, 1$ can be shifted in energy to a level such that the frequency of the asQ(6,6) transition from the Stark level in question coincides with the frequency of the laser beam. Specifically, an electric field which shifts the $|M|=6$ level by an amount necessary to achieve frequency coincidence with a laser beam at a wavelength of 10.784 $\mu$m may be generated by a voltage of about 940 volts when using the aforementioned specific exemplary electrode dimensions and separation. However, as will be explained more fully below, in devices according to the invention the absorption resonance may be tuned so that the frequency $f_l$ of the light beam 10 does not coincide with the frequency $f_o$ of the absorption peak but rather is slightly above or slightly below the peak absorption frequency.

Figure 2:
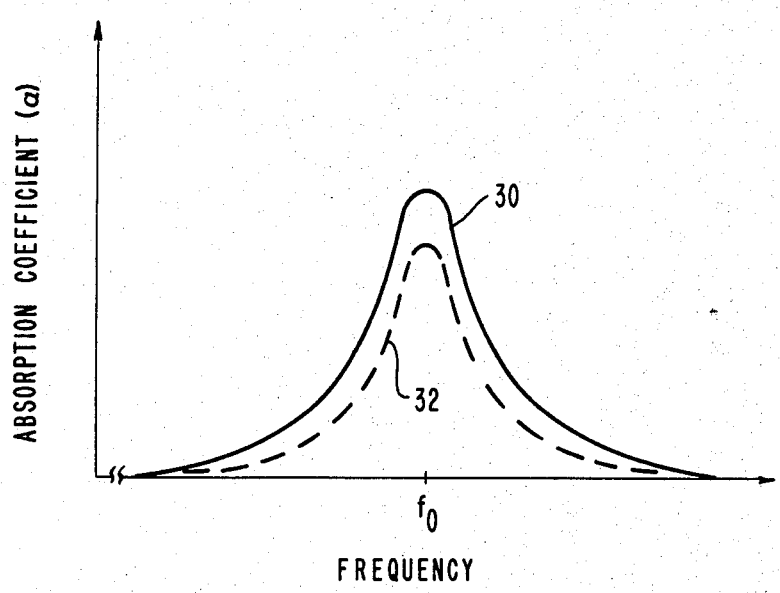
FIG. 2 is a graph illustrating the absorption coefficient $\alpha$ as a function of frequency for a pair of specific orthogonal polarizations of light in the Stark-active medium in the device of FIG. 1.

As was indicated above, when an appropriate electric field is generated within the Stark cell 16 between the electrodes 22 and 24, the gaseous medium within the cell 16 exhibits a dichroic absorption resonance centered about a frequency $f_o$ for light polarizations parallel and perpendicular to the electric field direction. This condition is illustrated in FIG. 2 (for the $|M|=6$ resonance) wherein solid curve 30 shows the absorption coefficient $\alpha$ for light polarized parallel to the direction of the electric field, and dashed curve 32 depicts the absorption coefficient for light polarized perpendicular to the electric field direction. It may be seen from FIG. 2 that as the light passed by the input polarizer 14 travels through the Stark cell 16, the component of light polarized parallel to the electric field undergoes greater absorption than the light component polarized perpendicular to the electric field at frequencies in the vicinity of the frequency $f_o$.

Figure 3:
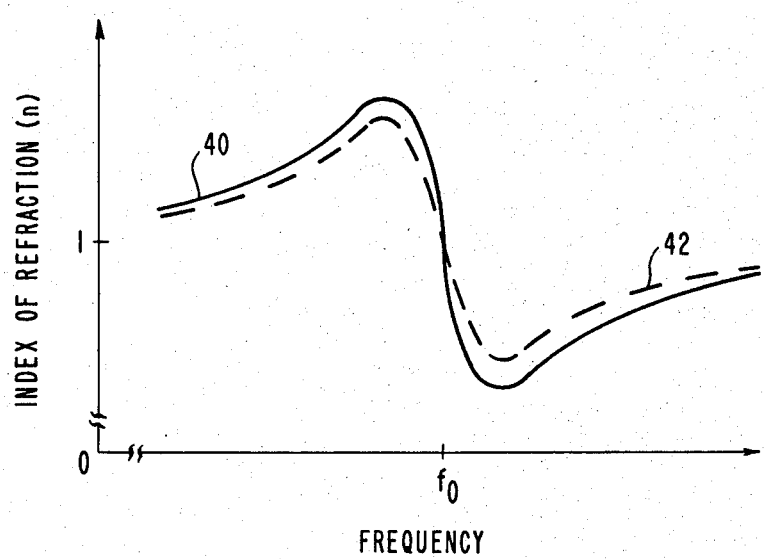
FIG. 3 is a graph showing the index of refraction n as a function of frequency for the aformentioned pair of orthogonal polarizations of light in the Stark-active medium in the device of FIG. 1.

As was also indicated above, for the appropriate electric field within the Stark cell 16, the medium within the cell 16 further exhibits birefringence at frequencies slightly above and slightly below the frequency $f_o$ of the absorption resonance for light polarizations parallel and perpendicular to the electric field direction. This condition is depicted in FIG. 3 (also for the $|M|=6$ resonance) wherein solid curve 40 illustrates the index of refraction n for light polarized parallel to the direction of the electric field, and dashed curve 42 shows the index of refraction n for light polarized perpendicular to the electric field direction. It may be seen from FIG. 3 that the index of refraction for light components polarized parallel and perpendicular to the electric field is different at all frequencies except at the resonant frequency $f_o$. Thus, as light from the input polarizer 14 at frequencies other then $f_o$ travels through the Stark cell 16, the light components polarized parallel and perpendicular to the electric field direction experience a different phase shift, and in general, elliptically polarized light emerges from the Stark cell 16.

In the operation of a device according to FIG. 1, upon passing through the input polarizer 14, the light beam 10 becomes linearly polarized along a direction established by the polarizer 14. When this light is of a frequency far away from the frequency $f_o$ to which the absorption resonance is tuned, negligible absorption or phase shift occurs in the Stark cell 16, and the light passes through the Stark cell 16 unaffected. Since this light remains linearly polarized along its original direction, and the output polarizer 18 is oriented to block this polarization, no output is provided from the polarizer 18.

When the frequency of the input light beam 10 is at the resonant frequency $f_o$, the light component traversing the Stark cell 16 polarized parallel to the electric field experiences greater absorption than the component polarized perpendicular to the electric field due to the dichroism of the Stark-active medium as depicted in FIG. 2. As a result, the light emerging from the Stark cell 16 has its direction of linear polarization changed from that established by the input polarizer 14, and hence the light incident upon the output polarizer 18 includes a component along the pass direction of the polarizer 18. This component is transmitted by the polarizer 18 to provide output beam 20.

When the frequency of the input light beam 10 is slightly above or slightly below the resonant frequency $f_o$, the dichroism depicted in FIG. 2 and the birefringence depicted in FIG. 3 both come into play, and the light components polarized parallel and perpendicular to the electric field experience a different phase shift as well as a different amount of absorption upon traversing the Stark cell 16. As a result, the relative magnitude of the light component polarized parallel to the pass direction of the output polarizer 18 reaches a maximum at frequencies slightly above and slightly below the resonant frequency $f_o$, and maximum transmission of light through the device occurs at these frequencies. As the frequency of the input light beam 10 moves further away from the resonant frequency $f_o$, the absorption and birefringence both diminish, and the transmission of light through the device decreases.

Figure 4:
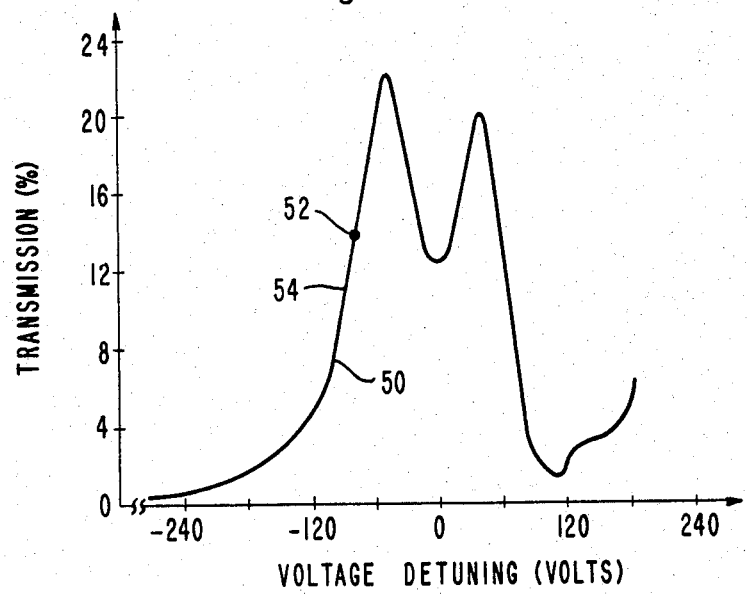
FIG. 4 is a graph plotting the light transmission as function of Stark voltage detuning for a specific exemplary device constructed according to FIG. 1.

The percent transmission of a device according to FIG. 1 which has been constructed using the aforementioned specific exemplary parameter values (with an input laser beam power of 0.94 mW) as a function of the voltage detuning of the aforementioned $|M|=6$ Stark resonance (i.e., the amount by which the voltage applied between the electrodes 22 and 24 differs from the aforementioned frequency coincidence value of 940 volts) is given by curve 50 of FIG. 4. It may be seen from FIG. 4 that a pair of transmission maxima occur at respective voltages of around +60 volts and around −60 volts away from the resonant voltage value and that the transmission decreases rapidly as the magnitude of the voltage detuning increases further, except for a small increase in transmission at around +180 volts (due to a second perturbed Stark resonance which occurs for $|M|=5$). In terms of frequency, the transmission maxima around +60 volts each lie about one absorption resonance linewidth away from the resonant frequency $f_o$ (the absorption resonance linewidth being defined by the frequencies for which the absorption coefficient α shown by curve 30 or 32 of FIG. 2 is at half of its maximum value).

The basic device of FIG. 1 finds use in a variety of applications. First, the device may be used to provide either digital modulation or linear amplitude modulation of an input light beam 10 of frequency $f_l$. When used as a digital modulator, voltage source 26 provides a control voltage which varies between a first value for which the absorption resonance overlaps the frequency $f_l$ (resulting in the transmission of some of the input light through the polarizer 18 to provide output beam 20), and a second value for which the absorption resonance does not overlap the frequency $f_l$ (whereby substantially all of the light is blocked by the polarizer 18). Such a modulator is capable of operating between an "on" condition in which in excess of 20% transmission is achieved and an "off" condition providing nearly zero output intensity (limited only by the extinction coefficient of the polarizers 14 and 18). Thus, a digital modulator according to the invention is capable of operating over a wide dynamic range exceeding 30 db (with an insertion loss of about 5 db). The control voltage provided by the source 26 may, of course, be a dc voltage, in which case the device functions as an optical shutter which selectively transmits or blocks the laser beam 10 as determined by the control voltage.

When operated as linear amplitude modulator, voltage source 26 provides a dc voltage of a value to tune the absorption resonance so that the frequency $f_l$ of the light beam 10 coincides with a point (such as 52) along a substantially linear portion (such as 54) of the transmission versus frequency characteristic 50 of the device. The source 26 additionally provides an ac modulating voltage for rapidly varying the point of coincidence 52 between the light beam frequency $f_l$ and the transmission versus frequency characteristic 50 along the substantially linear portion 54 so that linear amplitude modulation of the light beam 10 is achieved.

The device of FIG. 1 also may be used as an electrically tunable optical filter. In this application voltage source 26 provides a variable dc control voltage which tunes the absorption resonance to overlap a desired light transmission frequency. The filter functions as described above to pass some of the light at frequencies in the immediate vicinity of the desired transmission frequency while blocking light at frequencies remote from the transmission frequency. The filter provides a transmission characteristic given by curve 50 of FIG. 4 (with a corresponding frequency scale along the abscissa). The bandwidth of the filter is approximately equal to the linewidth of the absorption resonance, which for the aforementioned specific exemplary Stark medium is on the order of 100 MHz. However, the tuning range of the filter can be many GHz, depending upon the particular Stark medium and Stark cell geometry employed. As is the case with the modulator, the off-resonant transmission is limited primarily by the extinction coefficient of the polarizers 14 and 18.

Figure 5:
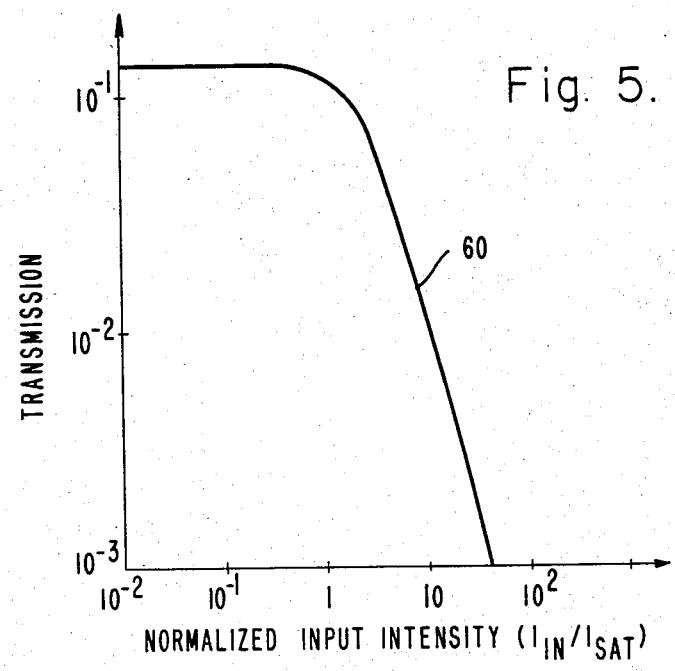
FIG. 5 is a graph illustrating the transmission as a function of normalized input intensity for an optical cutoff limiter according to the invention.
Figure 6:
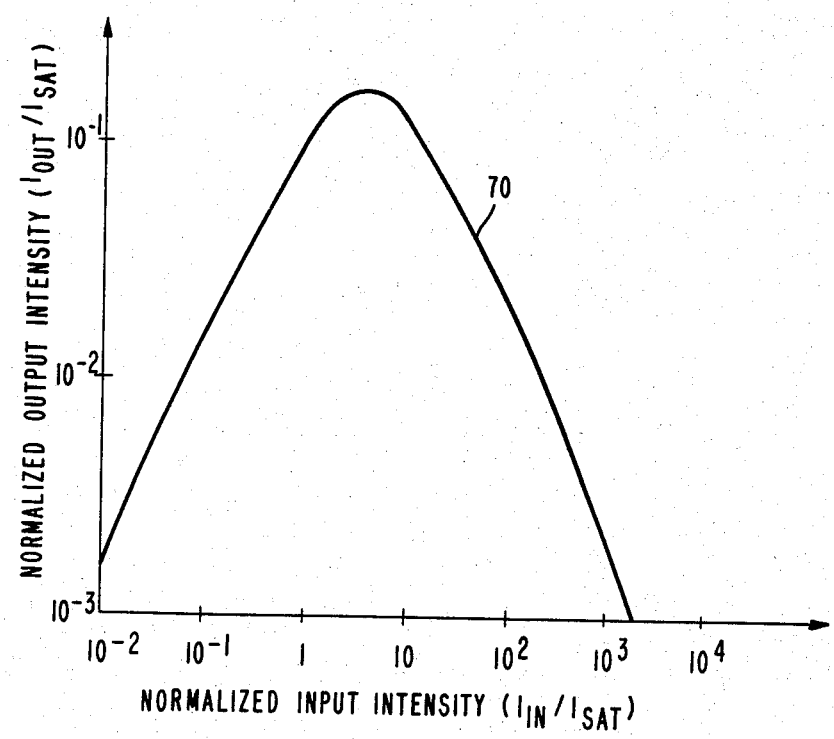
FIG. 6 is a graph showing the normalized output intensity as a function of normalized input intensity for the aforementioned optical cutoff limiter.

A still further application of the device of FIG. 1 is as an optical cutoff limiter. This application relies upon a saturation effect exhibited by the Stark-induced dichroism and birefringence. More specifically, when the intensity (power per unit area) of the input light beam 10 increases sufficiently, a saturation level will be reached, after which the dichroism and birefringence will decrease for further increases in the input beam intensity. This effect is illustrated by curve 60 of FIG. 5 which plots the transmission of the device of FIG. 1 as a function of the normalized input intensity (defined as the ratio of the input intensity $I_{IN}$ to the saturation intensity $I_{SAT}$). The resultant normalized output intensity $I_{IN}/I_{SAT}$ (which is the product of the input intensity and the transmission) as a function of the normalized input intensity $I_{IN}/I_{SAT}$ is shown by curve 70 of FIG. 6.

It may be seen from curve 70 that the output light intensity initially increases as the intensity of the input light increases until a saturation level is reached, after which the output intensity decreases for further increases in input intensity. Thus, a cutoff limiting function is provided in which high intensity light is greatly attenuated at frequencies encompassed by the absorption resonance. (At frequencies away from resonance substantially complete blockage of light occurs by virtue of the crossed polarizers.) Such a device lends itself to the protection of delicate or sensitive optical detectors from high intensity optical signals or noise. Moreover, since no mechanical, electrical, or electro-optical feedback is required, the response time of the device is limited only by molecular properties of the Stark medium.

The invention may also be useful for transient applications in which the device could modify input light amplitude (or phase) fluctuations, resulting in an output signal of a waveform different from that of the input. For example, the device could be used as a passive pulse shaping network for a given input signal. Also, for an input signal having large amplitude fluctuations which exceed the saturation intensity of the Stark medium, the device could yield an output wave that is limited in its maximum amplitude.

Thus, although the present invention has been shown and described with reference to particular embodiments, nevertheless, various changes and modifications which are obvious to a person skilled in the art to which the invention pertains are deemed to lie within the spirit, scope, and contemplation of the invention.

What is claimed is:

1. An optical device comprising:

first and second polarizers spaced from one another along a predetermined path and having their respective pass directions for linearly polarized light oriented perpendicular to one another;

a Stark cell disposed along said path between said first and second polarizers and having a pair of spaced electrodes disposed in respective planes parallel to said path and perpendicular to a predetermined direction other than parallel or perpendicular to the pass direction of said first polarizer;

means for directing a beam of light including a predetermined frequency through said first polarizer and said Stark cell along said path;

a gaseous medium contained within said Stark cell, said medium exhibiting a dichroic absorption resonance in the vicinity of said predetermined frequency for light polarizations parallel and perpendicular to said predetermined direction and further exhibiting birefringence at frequencies slightly above and slightly below the frequency of said absorption resonance for said parallel and perpendicular light polarizations; and means for applying a voltage between said Stark cell electrodes to controllably vary the frequency of said absorption resonance.

2. An optical modulator comprising:

first and second polarizers spaced from one another along a predetermined path and having their respective pass directions for linearly polarized light oriented perpendicular to one another;

a Stark cell disposed along said path between said first and second polarizers and having a pair of spaced electrodes disposed in respective planes parallel to said path and perpendicular to a predetermined direction other than parallel or perpendicular to the pass direction of said first polarizer;

means for directing a beam of light at a predetermined frequency through said first polarizer and said Stark cell along said path;

a gaseous medium contained within said Stark cell, said medium exhibiting a dichroic absorption resonance in the vicinity of said predetermined frequency for light polarizations parallel and perpendicular to said predetermined direction and further exhibiting birefringence at frequencies slightly above and slightly below the frequency of said absorption resonance for said parallel and perpendicular light polarizations; and means for applying a voltage between said Stark cell electrodes to controllably vary the frequency of said absorption resonance as a function of time and thereby modulate said light beam.

3. An optical modulator according to claim 2 wherein said voltage is varied between a first value for which said absorption resonance overlaps said predetermined frequency, whereby a portion of said light beam is passed by said second polarizer, and a second value for which said absorption resonance does not overlap said predetermined frequency, whereby said light beam is blocked by said second polarizer, thereby providing digital modulation of said light beam.

4. An optical modulator according to claim 2 wherein said voltage includes a dc component of a value to tune said absorption resonance so that said predetermined frequency coincides with a point along a substantially linear portion of the transmission versus frequency characteristic of said modulator, and said voltage further includes an ac component for rapidly varying the point of coincidence between said predetermined frequency and said transmission versus frequency characteristic along said substantially linear portion, whereby linear amplitude modulation of said light beam occurs.

5. An optical shutter comprising:

first and second polarizers spaced from one another along a predetermined path and having their respective pass directions for linearly polarized light oriented perpendicular to one another;

a Stark cell disposed along said path between said first and second polarizers and having a pair of spaced electrodes disposed in respective planes parallel to said path and perpendicular to a predetermined direction other than parallel or perpendicular to the pass direction of said first polarizer;

means for directing a beam of light at a predetermined frequency through said first polarizer and said Stark cell along said path;

a gaseous medium contained within said Stark cell, said medium exhibiting a dichroic absorption resonance in the vicinity of said predetermined frequency for light polarizations parallel and perpendicular to said predetermined direction and further exhibiting birefringence at frequencies slightly above and slightly below the frequency of said absorption resonance for said parallel and perpendicular light polarizations; and means for applying between said Stark cell electrodes a dc control voltage which is variable between a first value for which said absorption resonance is tuned to overlap said predetermined frequency, whereby a portion of said light beam is passed by said second polarizer, and a second value for which said absorption resonance is tuned to not overlap said predetermined frequency, whereby said light beam is blocked by said second polarizer.

6. An optical filter comprising:

first and second polarizers spaced from one another along a predetermined path and having their respective pass directions for linearly polarized light oriented perpendicular to one another;

a Stark cell disposed along said path between said first and second polarizers and having a pair of spaced electrodes disposed in respective planes parallel to said path and perpendicular to a predetermined direction other than parallel or perpendicular to the pass direction of said first polarizer;

means for directing a beam of light at a plurality of frequencies including a predetermined frequency through said first polarizer and said Stark cell along said path;

a gaseous medium contained within said Stark cell, said medium exhibiting a dichroic absorption resonance in the vicinity of said predetermined frequency for light polarizations parallel and perpendicular to said predetermined direction and further exhibiting birefringence at frequencies slightly above and slightly below the frequency of said absorption resonance for said parallel and perpendicular light polarizations; and means for applying a voltage between said Stark cell electrodes to tune said absorption resonance to overlap said predetermined frequency, whereby light at said predetermined frequency is passed by said second polarizer while light at frequencies remote from said predetermined frequency is blocked by said second polarizer.

7. An optical cutoff limiter comprising;

first and second polarizers spaced from one another along a predetermined path and having their respective pass directions for linearly polarized light oriented perpendicular to one another;

a Stark cell disposed along said path between said first and second polarizers and having a pair of spaced electrodes disposed in respective planes parallel to said path and perpendicular to a predetermined direction other than parallel or perpendicular to the pass direction of said first polarizer;

means for directing an input beam of light including a predetermined frequency through said first polarizer and said Stark cell along said path;

a gaseous medium contained within said Stark cell, said medium exhibiting a saturable dichroic absorption resonance in the vicinity of said predetermined frequency for light polarizations parallel and perpendicular to said predetermined direction and further exhibiting saturable birefringence at frequencies slightly above and slightly below the frequency of said absorption resonance for said parallel and perpendicular light polarizations; and means for applying a voltage between said Stark cell electrodes to tune said absorption resonance to overlap said predetermined frequency, whereby light at said predetermined frequency is passed by said second polarizer to provide an output beam of light of an intensity which increases as the intensity of said input beam increases until a saturation level is reached, after which the intensity of said output beam decreases for further increases in the intensity of said input beam.

* * * * *